INVENTOR
WILLIAM STELZER
BY
Olsen and Stephenson
ATTORNEYS

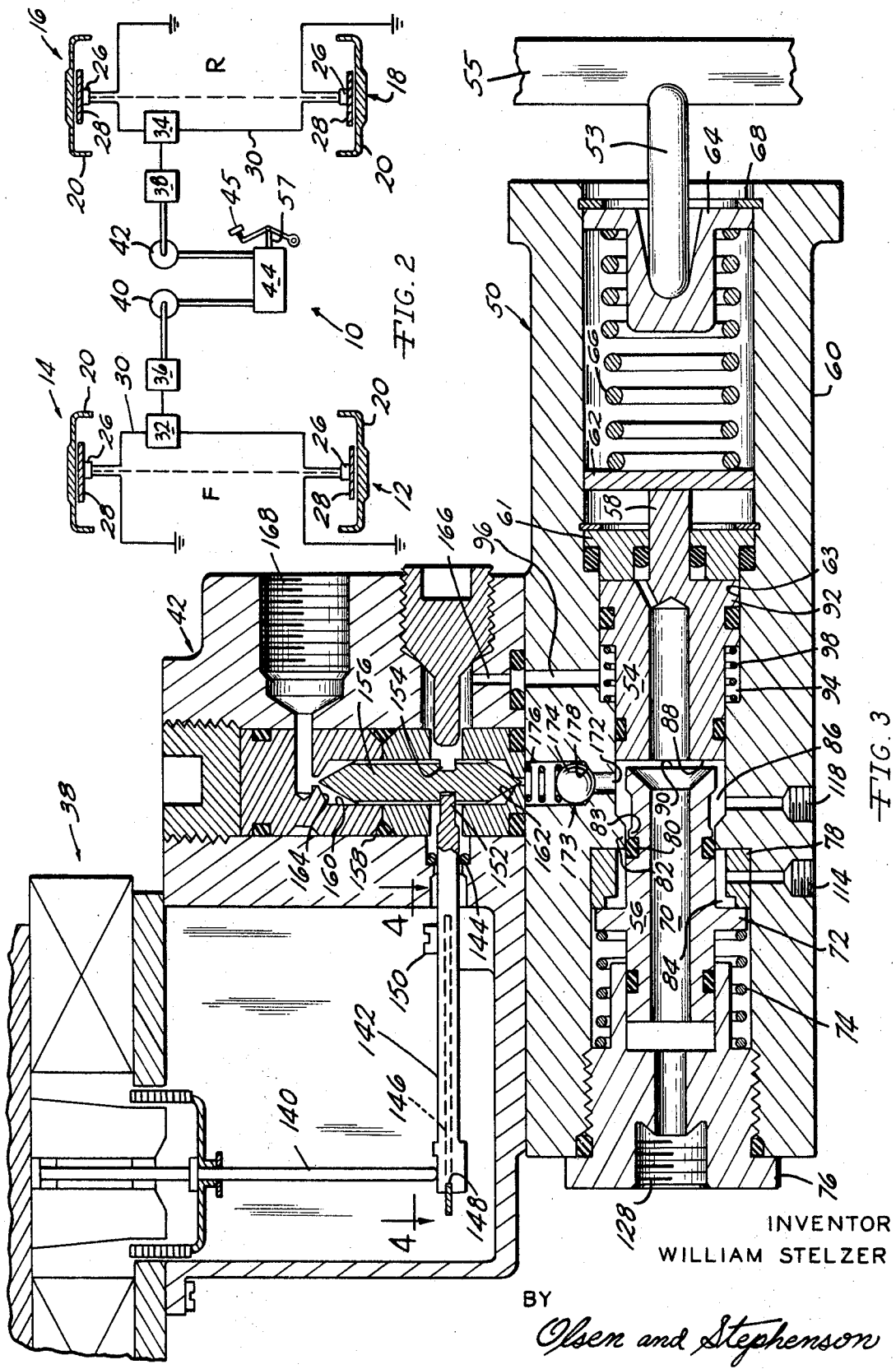

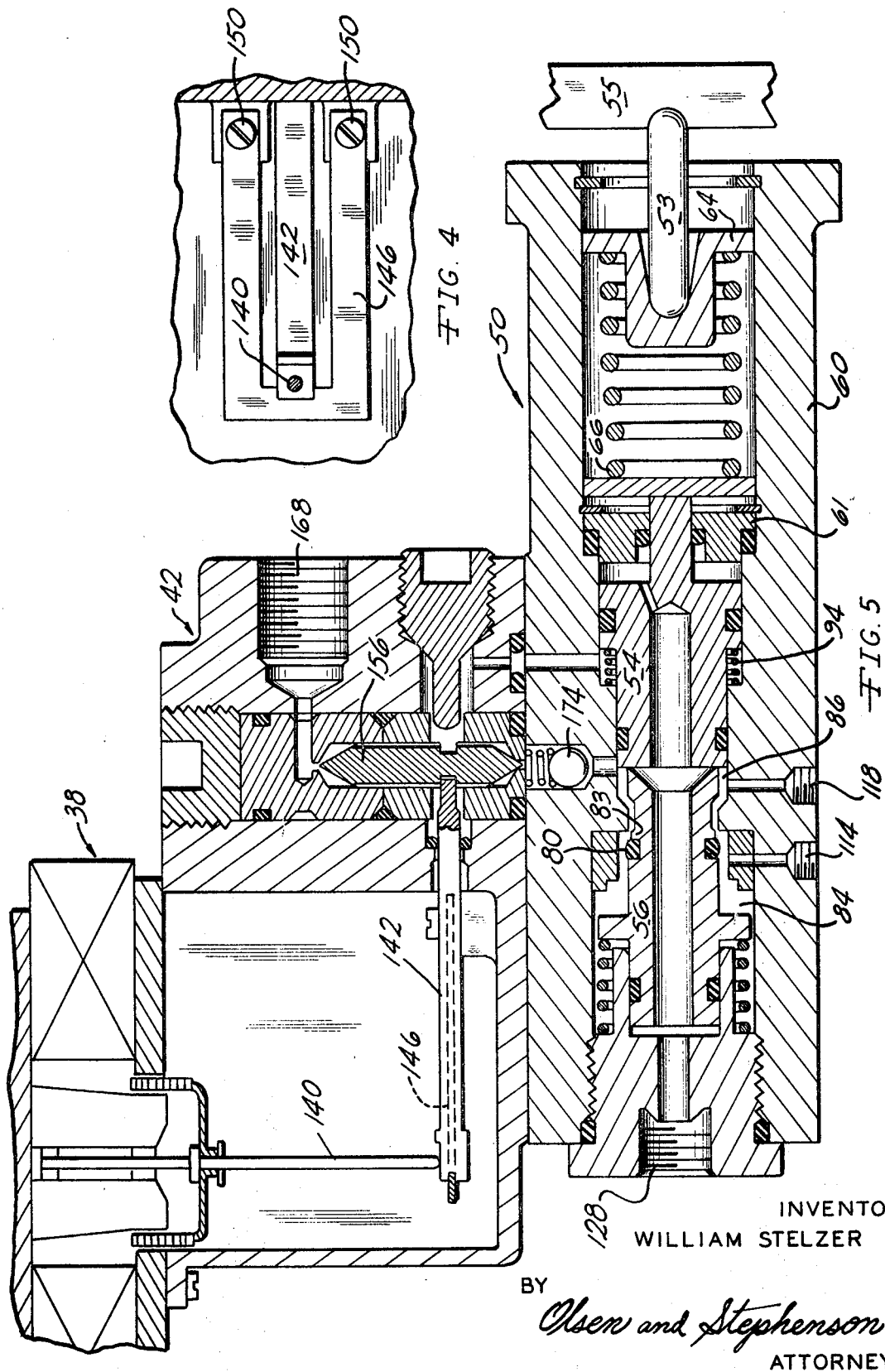

Aug. 18, 1970

W. STELZER 3,524,683

FLUID ACTUATED VEHICLE BRAKE SYSTEM
INCORPORATING SKID CONTROL

Filed Sept. 27, 1968

INVENTOR
WILLIAM STELZER

BY
*Olsen and Stephenson*
ATTORNEYS

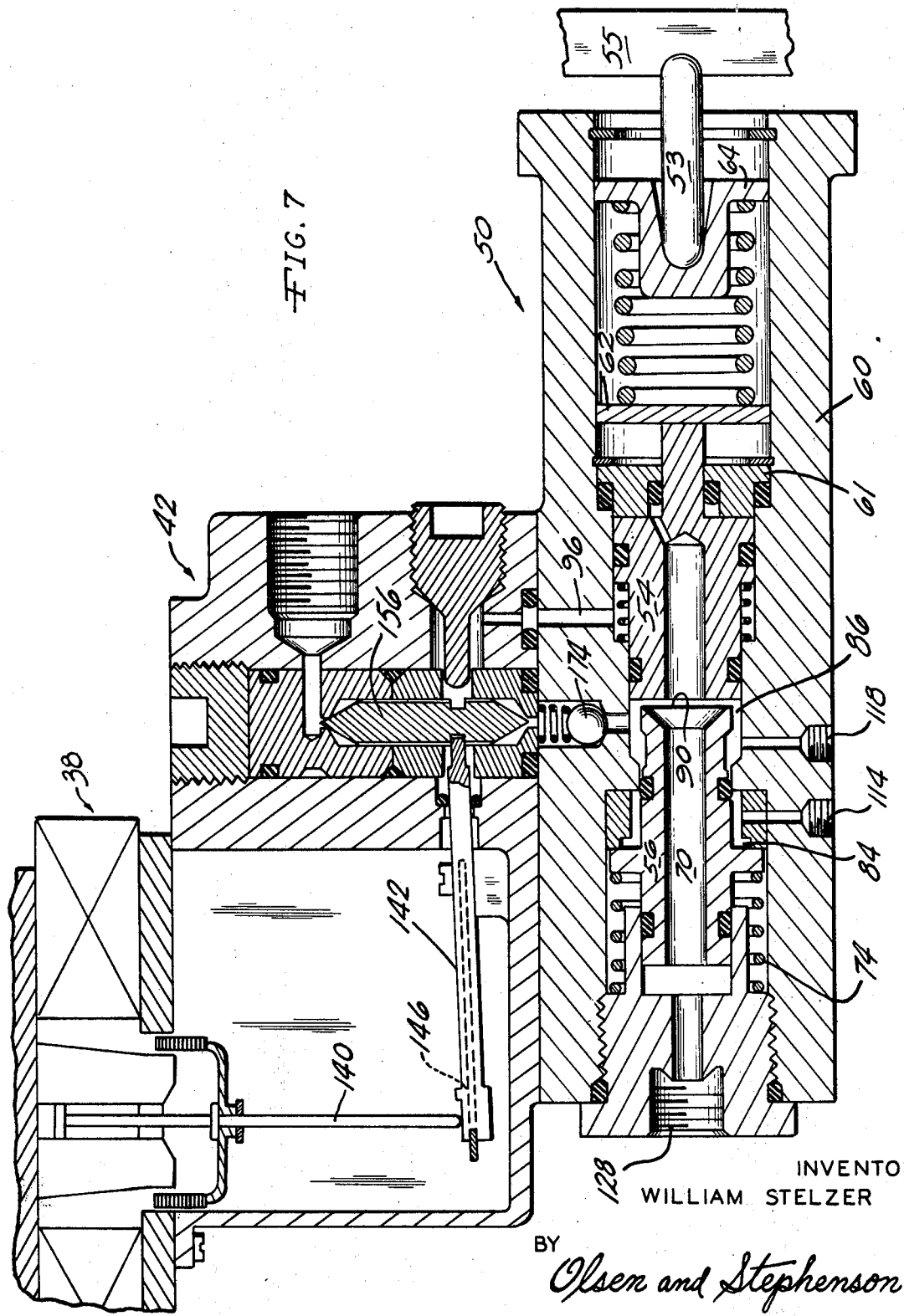

United States Patent Office 3,524,683
Patented Aug. 18, 1970

3,524,683
FLUID ACTUATED VEHICLE BRAKE SYSTEM INCORPORATING SKID CONTROL
William Stelzer, Milford, Mich., assignor to Kelsey-Hayes Company, Romulus, Mich., a corporation of Delaware
Filed Sept. 27, 1968, Ser. No. 763,088
Int. Cl. B60t 8/12, 8/26
U.S. Cl. 303—21                    7 Claims

ABSTRACT OF THE DISCLOSURE

A fluid actuated brake system for wheeled vehicles incorporating skid control providing for relief of the braking fluid pressure in response to a signal indicating a skid condition. A modular system is disclosed that is applicable to vehicles having substantially any number of wheels and in which compensation for vehicle weight transfer to the front wheels during braking is included.

---

This invention relates generally to skid control systems for fluid actuated brakes, and more particularly to a skid control system in which the passages which supply braking fluid to the wheels are selectively communicated to tank in response to a signal indicating a skid condition.

It is an object of the present invention, therefore, to provide an improved fluid actuated brake system incorporating skid control.

A further object of the invention is to provide an improved fluid actuated brake system for vehicles which is modular in character so that it is readily adapted to multi-axle vehicles by the addition of modules.

Another object of the present invention is to provide a fluid actuated brake system incorporating skid control in which isolated hydraulic circuits are provided for the various vehicle wheels to insure brake operation with skid control in the event of a breakdown in one of the circuits.

Still a further object of the present invention is to provide a fluid actuated brake system for wheeled vehicles incorporating skid control in which the normal transfer of vehicle weight to the front wheels during braking is compensated for in a simple and expedient manner.

It is known to incorporate skid control in a fluid actuated vehicle braking system by combining a pressure booster unit, which boosts the fluid pressure to the level desired for braking, with a de-booster unit which drops the pressure of the braking fluid when a skid condition arises. In systems of this type the de-booster unit must be of a size and capacity comparable to the size and capacity of the booster unit. An example of this system is illustrated in copending application Ser. No. 642,861 filed June 1, 1967, and assigned to the assignee of this application. In the system of the present invention, pumps are utilized for obtaining the necessary pressure on the braking fluid, and the fluid lines which convey braking fluid to the wheels are dumped, namely, communicated to tank, on the occurrence of a skid condition. This enables the manufacture of a small and relatively compact system in which the above-described booster and de-booster units are not required.

The system of the present invention is modular in character in that it includes a main valve for each wheel or each axle in the vehicle and a control valve which controls the operation of one or more main valves. This enables the system to be built up with the required number of modules to adapt it to a multi-axle vehicle of substantially any size. Furthermore, since a main valve is provided for each wheel or each set of axle wheels, separate valves accommodate the front and rear wheels thereby enabling ready incorporation in the valves of structure compensating for the normal transfor of the vehicle weight to the front wheels during braking.

Further objects, features and advantages of this invention will become apparent from a consideration of the following description, the appended claims, and the accompanying drawing in which:

FIG. 2 is a schematic diagram of a four wheel vehicle equipped with the braking system of this invention, showing principally the electrical circuitry in the system;

FIG. 3 is a longitudinal sectional view of a main valve in the system of this invention, showing the valve in assembly relation with the skid control valve associated therewith, and showing the valve structure in the position thereof when the vehicle brakes are released;

FIG. 4 is a fragmentary sectional view of a portion of the skid control valve in the system of this invention as seen from substantially the line 4—4 in FIG. 3;

FIG. 5 is a sectional view of the valve structure of this invention, illustrated similarly to FIG. 3, showing the valve structure in position corresponding to a brake applied condition when there is no signal that a skid condition exists;

FIG. 6 is a sectional view illustrated similarly to FIGS. 3 and 5 showing the valve structure in position immediately after being signaled that a skid condition exists; and FIG. 7 is a sectional view similar to FIGS. 3, 4 and 5 showing the valve structure in position releasing the brakes in response to the existence of a skid condition at one of the vehicle wheels.

Figure 1:
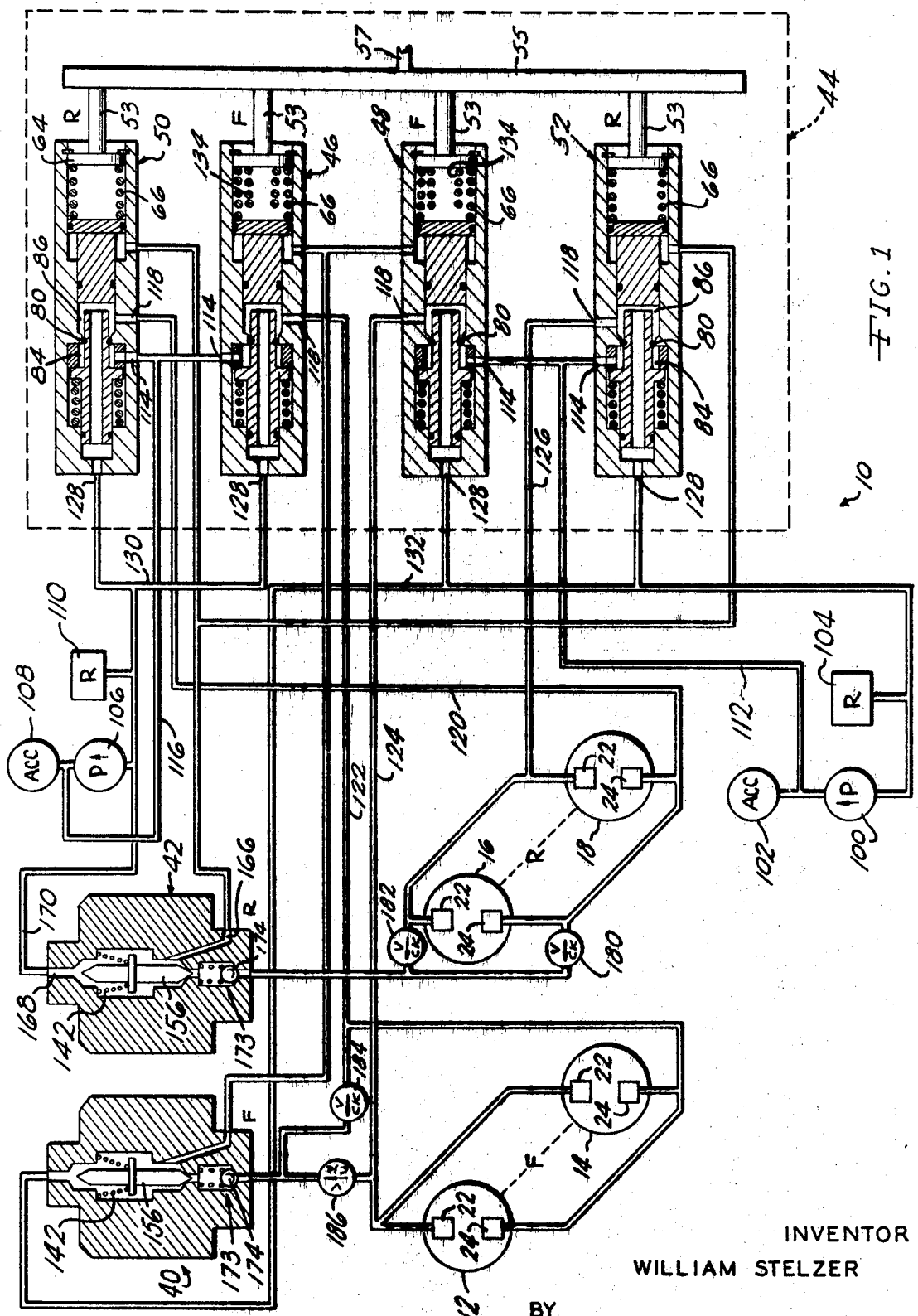
FIG. 1 is a diagrammatic view of the fluid circuitry in the system of this invention.

With reference to the drawing, the brake system of this invention, indicated generally at 10, is shown in FIGS. 1 and 2 applied to an automotive vehicle having a pair of front wheels 12 and 14 and a pair of rear wheels 16 and 18, although it is to be understood that the system can be utilized in a two wheel vehicle or a vehicle having several pairs of front and/or rear wheels. Also, in an automotive vehicle, the system of the present invention can be utilized in connection with either the front or rear wheels and is described herein with respect to both the front and rear wheels only for illustrative purposes.

As shown in FIG. 2, each of the vehicle wheels is equipped with a brake drum 20. The brakes associated with the drums 20 can be of a conventional construction and hence the details hereof have been omitted for the purposes of simplicity. In the illustrated embodiment of the invention, the brake for each of the wheels is operated by either one or both of a pair of conventional brake cylinders 22 and 24 (FIG. 1).

A sensor 26 and an exciter ring 28 of constructions known in the art, are associated with each of the brake drums 20. Each exciter ring 28 can be of a toothed construction and the sensor 26 can be of a permanent magnet or electromagnet construction which together define a variable reluctance pickup. Each exciter ring 28 is rotated with the adjacent brake drum 20, and hence with the associated wheel, and by virtue of the toothed construction, operates via the associated sensor 26 to provide a pulsating or alternating electrical signal via a conductor 30, which signal is an indication of the rotational velocity of the associated wheel.

In the illustrated embodiment of the invention, an electrical control module 32 is provided for the front wheels 12 and 14 and a similar module 34 is provided for the rear wheels 16 and 18. The control modules 32 and 34 are constructed to sense the rate of change in the signal at the conductors 30 and hence to sense the deceleration rate of the wheels associated with the brake drums 20 and to provide an output signal in response to the magnitude of the deceleration of the wheels reaching a preselected magnitude corresponding to a skid condition at the wheels. As used herein, the term "skid condition" is inclusive of both the actual occurrence of and the imminence of a skid condition at ony one of the wheels 12, 14, 16 and 18. As shown in FIG. 2, a conventional force motor 36 is associated with the control module 32 and a similar motor 38 is associated with the control module 34. In the system of the present invention the control modules 32 and 34 provide an "on" or "off" signal and the motors 36 and 38 are operated accordingly. The motor 36 actuates a control valve unit 40 and the motor 38 actuates a control valve unit 42; the valve units 40 and 42 being connected to a main valve assembly 44 which is operated by the brake pedal 45. Thus, the brakes are applied by depressing the brake pedal 45, and when a skid condition occurs at any of the wheels 12, 14, 16 and 18, one of the control modules 32 and 34 provides an actuating signal for the associated motor 36 or 38, respectively, which in turn actuates the associated control valve 40 or 42, respectively, which operates through the main valve assembly 44 to relieve the pressure of the braking fluid at the wheel where the skid condition exists.

As shown in FIG. 1, the main valve assembly 44 consists of four main valves 46, 48, 50 and 52, with the main vaves 46 and 48 controlling the front wheels 12 and 14 and the main valves 50 and 52 controlling the rear wheels 16 and 18. The main valves 46, 48, 50 and 52 are operated by actuating rods 53 connected to a common actuating bar 55 which is in turn connected through a lever 57 to the brake pedal 45 so that depression of the pedal 45 operates to move the rods 53 inwardly at the same rate.

Since the main valves are substantially identical, only the main valve 50, shown in its principal moved positions in FIGS. 3, 5, 6 and 7, will be described in detail hereinafter, with like numerals being used in FIG. 1 to indicate like parts in the valves. With reference to FIG. 3, the main valve 50 includes a housing 60 having an axial bore 63 in which a pair of pistons 54 and 56 are slidably mounted. The piston 54 has an extension 58 which extends through seal plate 61 and carries an abutment plate 62. An actuating plunger 64 is slidably mounted in the housing 60 and a compression spring 66 extends between the plunger 64 and the abutment plate 62 so that the spring 66 acts to urge the piston 54 and the plunger 64 in directions away from each other. The plunger 64 engages the actuating rod 53 so that it is moved in response to movement of the actuating rod 53 and a stop ring 68 is engageable with the plunger 64 to limit its movement in a direction outwardly of the housing 60.

The piston 56 is formed with an axial through opening 70 and is provided with a radially extending flange 72. A compression spring 74 extends between a plug 76 which is threaded into one end of the housing 60 and the flange 72 so as to urge the piston 56 in the direction of the piston 54 to a stop position in which the flange 72 engages an annular stop ring 78 in the housing 60. Intermediate its ends, the piston 56 carries an O-ring seal 80 which is engageable with a radially inwardly extending projection 82 in the housing 60 to block communication between an inlet chamber 84 and an outlet chamber 86 formed in the housing 60 around the piston 56.

The projection 82 constitutes a seat for the O-ring seal 80 which is held in position on the piston 56 by a radially extending shoulder 83 on the piston 56. There is slight clearance between the shoulder 83 and the seat 82 in the FIG. 3 position of the piston 56. As a result, on movement of the piston 56 toward the left from the FIG. 3 position, against the action of the compression spring 74, the seal 80 is moved away from the seat 82 so as to communicate the inlet chamber 84 and the outlet chamber 86. The shoulder 83, however, initially prevents a rush of fluid at high velocity and pressure past the seal 80 because the shoulder 83 partially blocks communication between the chambers 84 and 86 and permits only a reduced flow until the shoulder 83 has been moved to the left past the seat 82 to a position such as shown in FIG. 5. This blocking action of the shoulder 83 prevents erosion or other damage to the seal 80 by the flowing fluid. Movement of the piston 56 to the left is effected by depression of the brake pedal 45 so as to move the plunger 64 inwardly of the housing 60 with this movement of the plunger 64 being transmitted to the piston 54 by the spring 66. In the "brake release" position of the main valve 50 shown in FIG. 3, the piston 54 is spaced from the piston 56 so that the opening 70 in the piston 56 communicates with the outlet chamber 86 for a purpose to appear presently. When the plunger 64 is moved inwardly, to in turn move the piston 54 to the left as viewed in FIG. 3, the end 88 of the piston 54 sealingly abuts the end 90 of the piston 56 prior to imparting movement to the piston 56. Thus, the communication between the opening 70 and the outlet chamber 86 is discontinued prior to movement of the seal 80 to effect communication between the inlet chamber 84 and the outlet chamber 86.

The piston 54 has a radially outwardly extending portion 92 at one end which cooperates with the housing 60 to define an annular chamber 94 around the piston 54. The chamber 94 communicates with a passage 96 in the housing 60 and is hereafter referred to as the "brake release" chamber. A compression spring 98 in the chamber 94 extends between the piston portion 92 and the housing 60 so as to oppose motion of the piston 54 toward the left as viewed in FIG. 3.

Referring now to FIG. 1, it is seen that the system 10 includes a first pump 100 which is associated with an accumulator 102 and a tank or reservoir 104 in a conventional manner. A second pump 106 is similarly associated with an accumulator 108 and a reservoir or tank 110. The pump 100 supplies fluid under pressure to the accumulator 102 which is of preselected capacity sufficient to maintain a certain volume of fluid under pressure in a conduit 112 connected thereto and to the inlet ports 114 for the valves 48 and 52. A similar conduit 116 connects the accumulator 108 to the inlet ports 114 for the main valves 46 and 50. As shown in FIG. 3, the main valve 50 is constructed so that the inlet port 114 communicates with the inlet chamber 84. The outlet chamber 86 is connected to an outlet port 118 which is connected through a conduit 120 (FIG. 1) to the brake cylinders 24 for the rear wheels 16 and 18. The outlet port 118 for the main valve 46 is similarly connected by a conduit 122 to the wheel cylinders 24 for the front wheels 12 and 14; the outlet port 118 for the main valve 48 is connected by a conduit 124 to the wheel cylindres 22 for the front wheels 12 and 14; and the main valve 52 has its outlet port 118 connected by a conduit 126 to the wheel cylinders 22 for the front wheels 16 and 18.

As shown in FIG. 3, the main valve 50 is provided with a return port 128 in the plug 76 which communicates with the opening 70 in the piston 56. This return port 128 is connected by a conduit 130 to the return port 128 in the main valve 46 and to the reservoir 110. A similar conduit 132 connects the return ports 128 in the main valves 48 and 52 to the reservoir 104.

In the operation of the brake assembly 10 to apply the vehicle brakes, assume that the main valves 46, 48, 50 and 52 are in the brake release positions illustrated in FIGS. 1 and 3. In such positions, supply fluid under pressure in the conduits 112 and 116 is supplied to the inlet chambers 84, but the seals 80 block communication of this fluid with the outlet chambers 86. The brake cylinders 22 and 24 communicate through the conduits 120, 122, 124 and 126 with the outlet chambers 86 which in turn communicate through the piston openings 70 and the return ports 128 with the reservoirs 104 and 110 so that there is no supply of braking fluid under pressure to the cylinders 22 and 24. Now assume that the brake pedal 45 is depressed so as to move the main valve plungers 64 inwardly to compress the springs 66 which provide "feel" to the brake pedal 45. Compression of the spring 66 in the valve 50 first moves the piston 54 to the left as viewed in FIG. 3 to a position engaging the end 90 of the piston 56 to block communication of the rear wheel cylinders 24 with the reservoir 110. The other main valves 46, 48 and 52 operate concurrently to block communication of the other wheel cylinders 22 and 24 with the reservoirs 104 and 110. The piston 54 in each main valve then moves the piston 56 therein toward the left, as viewed in FIG. 3, against the action of the spring 74 so as to move the seal 80 out of engagement with the annular projection 82 and communicate the inlet chamber 84 with the outlet chamber 86, as shown in FIG. 5 for the main valve 50.

As the piston 54 is progressively moved to the left, the degree of communication of the inlet chamber 84 and the outlet chamber 86 is progressively increased so that braking fluid at an increased rate is supplied to the passages 120, 122, 124 and 126 so as to actuate the wheel cylinders 22 and 24 to apply the vehicle brakes with a hydraulic pressure proportional to the degree of compression of springs 66 and the operator pressure on the pedal 45. When this pressure is attained, it creates a force on the annular portion of the end 88 of the piston 54 which is exposed to the chamber 86 sufficient to move the piston 54 toward the right in FIG. 5. This movement continues only until the seal 80 engages the seat 82. Thus, the modulated brake pressure provides "feel" to the pedal 45 enabling the vehicle operator to sense the extent to which the brakes are being applied. As soon as pressure on the brake pedal 45 is released, the spring 66 in each main valve will return the plunger 64 to its retracted position and the springs 98 and 74 will return the pistons 54 and 56, respectively, to the positions shown in FIG. 3.

It is well known that in an automotive vehicle the simultaneous application of front and rear wheel brakes causes the center of mass of the vehicle to move toward the front of the vehicle due to the vehicle suspension system arrangement. To compensate for this weight transfer, it is desirable to incorporate in a braking system a means for applying the front wheel brakes to a greater degree than the rear wheel brakes as braking of the vehicle proceeds. This weight transfer is readily compensated for in the system 10 of this invention by the simple expedient of adding an auxiliary spring 134 to each of the main valve assemblies 46 and 48 which control supply of fluid to the front wheel brake cylinders 22 and 24. In each valve assembly, the spring 134 is of a shorter length than the compression spring 66 so that it does not transmit inward movement of the plunger 64 to the piston 54 until the front wheel brakes have been partially applied. At such time, the springs 134 provide for increased application of the front wheel brakes while the rear wheel brakes are being applied at a lesser rate. It can thus be seen that the simple addition of the auxiliary springs 134 compensates for the weight transfer which normally occurs during vehicle braking.

With the above description of the use of the braking system 10 to apply the brakes as background, assume now that a skid condition occurs at one of the vehicle wheels, and for purposes of illustration let it be assumed that the skid condition occurs at one of the rear wheels 16 or 18. In such case, the module 34 provides an electrical signal to the motor 38 (FIG. 3) of sufficient magnitude to move the actuating shaft 140 for the force motor 38 downwardly to in turn pivot an actuating lever 142 in a counterclockwise direction about an O-ring support 144 carried by the control valve 42. A U-shaped leaf spring 146 (FIGS. 3 and 4), which is attached at 148 to the lever 142 and mounted by screws 150 on the control valve 42, is bias set to maintain the lever 142 in its position shown in FIG. 3 and keep the shaft 140 in an "off" position. When the shaft 140 is forced downwardly by the motor 38, it pivots the inner end 152 of the lever 142 upwardly as viewed in FIG. 3. The end 152 of the lever 142 is positioned in a notch 154 in a valve element 156 which is slidably mounted in a cylinder 158 in the control valve 42. The cylinder 158 includes a bore 160 formed at its opposite ends with seats 162 and 164. The valve element 156 is shaped at its ends to sealingly engage the seats 162 and 164, and is shown in FIG. 3 engaged with the seat 162. Intermediate its ends, the bore 160 communicates with a passage 166 which in turn communicates with the passage 96 in the main valve housing 60 which supplies fluid to the brake release chamber 94.

At the seat 164, the bore 160 communicates with a return port 168 which is in turn connected via a passage 170 to the reservoir 110. At the seat 162, the bore 160 communicates with a passage 172 in the valve housing 60 which is connected to the outlet chamber 86. A check valve assembly 173 is interposed in the system 10 between the control valve seat 162 and main valve outlet chamber 86. In FIG. 3, the check valve assembly 173 is shown positioned in the housing passage 172 while in the diagrammatic view of FIG. 1 it is shown as a part of the control valve 42 for ease of illustration. It is to be understood that the check valve assembly 173 can be located in either the main or the control valve since the operation of system 10 is identical in both instances. The check valve assembly 173 includes a ball 174 urged by a spring 176 against a seat 178 to limit flow between outlet chamber 86 and control valve bore 160 to flow in one direction, namely, a direction from chamber 86 toward the bore 160.

Thus, assuming the existence of a skid condition at one of the rear wheels 16 and 18, the main valve assembly 50 is in its position shown in FIG. 6, the fluid pressure in the outlet chamber 86 has unseated the ball 174, and the lever 142 has moved the valve element 156 off its seat 162 and onto its seat 164 thereby providing for flow of fluid under pressure through the control valve 42 into the brake release chamber 94. The presence of pressure fluid in the chamber 94 will result in a force on the piston 54 directed toward the right as viewed in FIG. 6 opposing the pressure of the spring 66 on the piston 54 and supplementing the pressure of the spring 98 on the piston 54. This force is of a magnitude sufficient to move the pistons 54 toward the right to a stop position against the seal plate 61 (FIG. 7) without affecting the position of the brake pedal 45. Movement of the piston 54 to this position immediately provides for movement of the piston 56, by the spring 74, to a position in which the seal 80 blocks communication between the inlet chamber 84 and the outlet chamber 86 and also moves the piston 54 out of engagement with the piston 56 so as to communicate the outlet chamber 86 with the reservoir 110 through the return port 128. The braking fluid supply conduit 120 for the rear wheel brake cylinders 24 is thus connected to the tank 110 to provide for a complete release of the rear wheel brakes. The check valve assembly 173 closes so that fluid is retained in the brake release chamber 94 in the event the skid condition continues to maintain the lever 142 in its position shown in FIGS. 6 and 7 in which it keeps the valve element 156 engaged with the seat 164.

Thus, the vehicle brakes cannot be re-applied until the signal to the motor 38 is discontinued and the spring 146 returns the lever 142 to its FIG. 3 position. At such time, the brake release chamber 94 is communicated through the control valve 42 with the reservoir 110 so that the pressure of the spring 66 on the piston 54 will be effective to return the piston 54 to its FIG. 6 position to provide for re-application of the vehicle brakes.

In the above-described operation of the system 10 to respond to a skid condition at a rear wheel, only the detailed operation of the main valve assembly 50 is included. The main valve assembly 52 operates in unison with the valve assembly 50 to concurrently control the rear wheel brake cylinders 22 through the braking fluid supply conduit 126.

Since the control valve 40 and 42 are identical, the operation of the valve 40 to control the main valves 46 and 48 so as to release the supply of fluid to the conduits 122 and 124 supplying braking fluid to the front wheel brake cylinders 22 and 24 is the same as that described above for the control valve 42. Consequently, like numerals are used in FIG. 1 to indicate like parts on the control valves 40 and 42 and further detailed description of the operation of the control valve 40 is not included here. It can thus be seen that in the illustrated embodiment of the invention the main valves 50 and 52 operate in unison to supply braking fluid under pressure through the passages 120 and 126 to the rear wheel brake cylinders 22 and 24 and to dump the fluid pressure in these passages into the reservoirs 104 and 110, respectively, in response to a skid condition. Similarly, the main valves 46 and 48 operate in unison to provide for a supply of braking fluid through the passages 122 and 124 to the front wheel brake cylinders 22 and 24 to apply the brakes and to dump the fluid in these passages into the reservoirs 104 and 110 in response to a skid condition at the front wheels.

In the illustrated system 10 shown in FIG. 1, two main valves are provided in each instance for the front and rear wheels since each wheel includes a pair of brake cylinders 22 and 24, which is common in truck brake systems. In the event the brake system has only one wheel cylinder at each wheel, the valve assembly 44 would include only two main valves instead of the illustrated four. For example, the system could include only the two main valves 46 and 50 in which case the pump 100 could be eliminated. On the other hand, in the event two pumps 100 and 106 are desired, for safety purposes, the main valve 48 would be employed. In the event the system includes only two main valves and two control valves, the construction shown in FIGS. 3, 5, 6 and 7 wherein the control valve 42 is shown mounted directly on the main valve housing 60 is advantageous for purposes of compactness. When the system includes additional main valves, as shown in FIG. 1, the separation of the main and control valves is advantageous because it enables complete isolation of the hydraulic circuits for the various wheel brake cylinders. As shown in FIG. 1, a check valve 180 is interposed in the passage which connects the braking fluid supply passage 120 to the control valve 42. A similar check valve 182 is interposed between the passage 126 and the control valve 42. A check valve 184 is in the passage which connects the braking fluid supply passage 122 to the valve 40 and a check valve 186 is in the line which connects the braking fluid supply passage 124 to the control valve 40. As a result, in the event of failure of the pump 100 or a leak in any of the conduits connected thereto, the brake cylinders 24 will still be fully operable to apply the front and rear wheel brakes and the check valves 182 and 186 will prevent leakage of fluid from the wheel cylinders 24 through the pump 100 or any of the conduits connected thereto. Similarly, in the event of failure of the pump 106 or a leakage in any of the passages connected thereto, the wheel cylinders 22 can still be operated from fluid from the pump 100 to apply the front and rear wheel brakes with the check valves 180 and 184 preventing leakage of fluid from the wheel cylinders 22 through the pump 106 or a leak in any of the passages connected thereto. Thus the check valves 180, 182, 184 and 186 provide for isolation of the various wheel cylinder supply conduits which is desirable for safety purposes.

From the above description, it is seen that this invention provides a hydraulic braking system with skid control in which brake pedal operated main valves, such as the valves 46, 48, 50 and 52, and control valves, such as the valves 40 and 42, cooperate with one or more pumps, such as the pumps 100 and 106 to dump braking fluid from the braking fluid supply conduits to tank in response to a signal indicating a skid condition. This enables the provision of a compact system which operates quickly and effectively to both apply the brakes and release the brakes when necessary to alleviate a skid condition. The combination of an accumulator, preferably of a capacity to supply the fluid necessary for one skid control cycle, with each pump enables the use of a smaller capacity pump in each instance. Conventional force motors are illustrated as being the means for converting the signals from the modules 32 and 34 into forces of a magnitude to actuate the shafts 140 which operate the control valves 40 and 42, but it is to be understood that solenoid-type devices and other equivalent electrical devices are usable in the system 10 for this purpose.

What is claimed is:

1. In a brake system for a vehicle which includes at least one wheel and a passage for supplying braking fluid to said wheel and means associated with said wheel for generating a predetermined signal corresponding to a skid condition at said wheel, the improvement comprising main valve means connected to said passage, means for supplying fluid under pressure to said main valve means, said main valve means being movable between a brake applying position in which it provides for communication of said fluid supply means and said passage and a brake release position in which said main valve means blocks said communication, manually movable means operable to move said main valve means to said brake applying position, spring means operatively associated with said manually movable means for transmitting a force on said manually movable means into a force on said valve means, and control valve means responsive in operation to the existence of said signal to cause fluid under pressure from said supply means to move said main valve means from said brake applying position to said brake release position against the force of said spring means.

2. The structure according to claim 1 wherein said means for supplying fluid under pressure is a pump and further including a reservoir for fluid connected to said pump, said main valve means in said brake release position providing for communication of said passage and said reservoir.

3. The structure according to claim 1 further including means connecting said control valve means and said main valve means providing for communication of said fluid supply means and said control valve means in the brake applying position of said main valve means.

4. The structure according to claim 2 wherein said manually movable means includes a brake pedal and means including said spring means connecting said brake pedal and said main valve means operable in response to movement of said brake pedal to move said main valve means to said brake applying position.

5. In a brake system for a vehicle having front and rear wheels, first passage means for supplying braking fluid to said front wheels, second passage means for supplying braking fluid to said rear wheels, first means associated with said front wheels for generating a predetermined first signal corresponding to a skid condition at a front wheel, and second means associated with said rear wheels for generating a predetermined second signal corresponding to a skid condition at a rear wheel, the improvement comprising first main valve means connected to said first passage means, second main valve means connected to said second passage means, pump means for supplying fluid under pressure to said main valve means, each of said main valve means being movable between a brake applying position in which it provides for communication of said pump means and said passage means connected thereto and a brake release position in which said main valve means blocks said communication, first control valve means connected to said first main valve means and responsive in operation to the existence of said predetermined first signal to cause fluid from said pump means to move said first main valve means from said brake applying position to said brake release position, second control valve means connected to said second main valve means and responsive in operation to the existence of said predetermined second signal to cause fluid from said pump means to move said second main valve means from said brake applying position to said brake release position, each of said main valve means including a housing having a bore formed therein, piston means slidably supported in said bore for movement to positions defining said brake applying and brake release positions, a manually movable plunger slidably supported in said housing, and compression spring means extending between said piston means and said plunger for transmitting movement of said plunger to said piston means in a direction tending to move said piston means from said brake release position toward said brake applying position.

6. In a brake system having the structure set forth in claim 5 further including auxiliary compression spring means in said first main valve means operable to transmit movement of said plunger toward said piston means into movement of said piston means after said plunger is moved beyond a position of said plunger spaced a predetermined distance from said piston means.

7. In a brake system having the structure set forth in claim 5 wherein said piston means and said housing in each main valve means coact to form a chamber in said housing communicating with said control valve means, said piston means being responsive to a supply of fluid to said chamber to move against the pressure of said compression spring means to said brake release position, and check valve means communicating with said chamber and operable to block flow of fluid therefrom in said brake release position of said piston means.

References Cited

UNITED STATES PATENTS

| | | |
|---|---|---|
| 3,004,801 | 10/1961 | Wrigley. |
| 3,093,422 | 6/1963 | Packer et al. |
| 3,286,734 | 11/1966 | Hartshorne. |

MILTON BUCHLER, Primary Examiner

J. J. McLAUGHLIN, JR., Assistant Examiner

U.S. Cl. X.R.

303—6, 10, 61